US 6,698,452 B2

(12) United States Patent
Sisk et al.

(10) Patent No.: US 6,698,452 B2
(45) Date of Patent: Mar. 2, 2004

(54) CYCLE REVERSING VALVE FOR USE IN HEAT PUMPS

(75) Inventors: Gregory Edward Sisk, Farmington, MO (US); George J. Sciuto, St. Louis, MO (US); Thomas Hopkins, St. Louis, MO (US); Glenn Edison Walters, Bridgeton, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/765,262

(22) Filed: Jan. 18, 2001

(65) Prior Publication Data

US 2002/0005221 A1 Jan. 17, 2002

Related U.S. Application Data

(63) Continuation-in-part of application No. 09/487,864, filed on Jan. 19, 2000, now Pat. No. 6,289,931.

(51) Int. Cl.[7] .............................................. F16K 11/06
(52) U.S. Cl. .................................. 137/625.43; 251/174
(58) Field of Search ........................ 137/625.18, 625.43, 137/625.48, 625.68; 251/147, 148, 174

(56) References Cited

U.S. PATENT DOCUMENTS

| 944,598 A | * 12/1909 | Caskey ........................ 251/174 |
| 2,388,890 A | 11/1945 | Whitted |
| 2,527,341 A | 10/1950 | Walter |
| 2,693,930 A | * 11/1954 | Carter .................... 137/625.43 |
| 2,921,604 A | 1/1960 | Zettl |
| 2,927,606 A | 3/1960 | Matchett, Jr. et al. |
| 2,969,655 A | 1/1961 | Salter |
| 2,976,701 A | 3/1961 | Greenawalt |
| 2,983,286 A | 5/1961 | Greenawalt et al. |
| 3,032,312 A | 5/1962 | Greenawalt |

(List continued on next page.)

FOREIGN PATENT DOCUMENTS

DE 29 19 364 * 11/1980 ............ 137/625.48

OTHER PUBLICATIONS

Brochure, P.E. Valve Company, Inc., Asheville, N.C. "Features That Make PE Valves Extra Dependable and Energy Efficient" (Date unknown), pp. 1–2.

*Primary Examiner*—John Fox
(74) *Attorney, Agent, or Firm*—Harness, Dickey & Pierce, P.L.C.

(57) ABSTRACT

A four port reversing valve for a reversible-cycle refrigeration system having a compressor is constructed with the reversing valve having a first inlet port adapted to be connected to the compressor and second, third, and fourth ports. The four port reversing valve is further provided with a valve member operable between first and second positions. The valve member in its first position connects the first inlet port with the second port and the third port with the fourth port, and the valve member in its second position connects the first inlet port with the fourth port, and the second port with the third ports. The second and third ports and the third and fourth ports are arranged so that the angle between the ports is about 135°. In one embodiment the valve member rotates, and in another it translates linearly. Several means are disclosed for actuating the valve member.

6 Claims, 9 Drawing Sheets

U.S. PATENT DOCUMENTS

| | | | |
|---|---|---|---|
| 3,039,491 A | 6/1962 | Raney | |
| 3,045,700 A | 7/1962 | Wiegers | |
| 3,056,574 A | 10/1962 | Greenawalt | |
| 3,111,960 A | 11/1963 | Marmo | |
| 3,212,527 A * | 10/1965 | Hall et al. | 137/625.43 |
| 3,400,736 A | 9/1968 | Bastle et al. | |
| 3,472,280 A | 10/1969 | VanScoy | |
| 3,527,256 A * | 9/1970 | Colombo | 137/625.48 |
| 3,680,788 A | 8/1972 | Cox | |
| 3,701,365 A | 10/1972 | Abdo | |
| 3,861,420 A * | 1/1975 | Lloyd et al. | 137/625.43 |
| 3,894,561 A | 7/1975 | Thornbery | |
| 3,897,043 A | 7/1975 | McBain et al. | |
| 3,952,537 A | 4/1976 | Aoki et al. | |
| 3,985,154 A | 10/1976 | Hargraves | |
| 4,025,050 A | 5/1977 | Manki et al. | |
| 4,176,823 A | 12/1979 | Gliatas | |
| 4,200,258 A | 4/1980 | Gliatas | |
| 4,202,373 A | 5/1980 | Hargraves et al. | |
| 4,213,483 A | 7/1980 | Bauer | |
| 4,221,237 A | 9/1980 | Nelson | |
| 4,248,058 A | 2/1981 | Bauer et al. | |
| 4,255,939 A | 3/1981 | Ou | |
| 4,290,453 A | 9/1981 | Bauer | |
| 4,318,425 A | 3/1982 | Marks | |
| 4,335,739 A * | 6/1982 | Fields | 137/269 |
| 4,340,202 A | 7/1982 | Hargraves et al. | |
| 4,469,134 A | 9/1984 | Kanai et al. | |
| 4,492,252 A | 1/1985 | Kanai | |
| 4,573,497 A | 3/1986 | White | |
| 4,619,118 A | 10/1986 | Chu et al. | |
| 4,644,760 A | 2/1987 | Aoki et al. | |
| 4,702,088 A | 10/1987 | Ozu | |
| 4,702,269 A * | 10/1987 | Schuler | 137/246.12 |
| 4,712,582 A | 12/1987 | Marks | |
| 4,760,709 A | 8/1988 | Aoki et al. | |
| 4,966,194 A | 10/1990 | Nakatsukasa et al. | |
| 5,507,315 A | 4/1996 | Parker | |

* cited by examiner

CYCLE REVERSING VALVE FOR USE IN HEAT PUMPS

CROSS-REFERENCED TO RELATED APPLICATION

This application is a continuation-in-part of U.S. patent application Ser. No. 09/487,864 filed Jan. 19, 2000 U.S. Pat. No. 6,289,931.

FIELD OF THE INVENTION

This invention relates generally to heat pump systems, and more particularly, to a cycle reversing valve for use in heat pump systems.

BACKGROUND AND SUMMARY OF THE INVENTION

It is well known to use cycle reversing valves to control the operation of heat pumps. These valves, often referred to as "four way valves" or "switch over valves", are used to reverse the refrigerant line connections to a compressor, such that the heat pump can either pump heat into or out of the area to be heated or cooled.

Cycle reversing valves for use in heat pumps typically are provided with a flow plate through which there are port passages. Flow is controlled by a "bathtub" which moves to cover and uncover ports in the flow plate. The bathtub shape requires an abrupt 180 degree turn of the suction flow. However, the "bathtub" causes a loss of efficiency or SEER loss. This loss occurs through the suction gas line and the discharge gas line of the heat pump and from heat transfer. In particular, suction gas loss results from the restriction in the flow plate and the 180° bend of the bathtub. The discharge gas loss results from abrupt changes in expansion and contraction, as well as from the flow path of the discharge line. Cold suction gas inside the "bathtub", which is surrounded by hot discharge gas, causes heat transfer loss.

Numerous patents are directed to reversing valves which attempt to improve the efficiency of the heat pump and/or simplify its operation by modifying the structure and configuration of the valve member. These valves include ones providing control for the opening or shutting the discharge and suction ports through direction of pressure differential between the high and low side of the system. Other valves use complex switching and control elements, which may include numerous springs, cylinders and pistons, in an attempt to improve the efficiency of the heat pump. Still other valve designs attempted to modify the valve member itself, for example, by providing a butterfly valve, to increase efficiency and simplify construction. Still other valve structures included multiple chambers or multiple valves in an attempt to simplify the design or increase efficiency of the reversing valve.

Overall, most known reversing valves do not sufficiently reduce or limit the losses that occur in heat pumps. Therefore, what was needed was a new reversing valve to reduce or limit efficiency loss, while providing a less complex design for controlling and/or shifting the reversing valve, which had fewer component parts.

The cycle reversing valve of the present invention provides a simple valve design, having few component parts, which provides a direct path through the valve for the suction gas, thereby increasing the efficiency of the system in which the valve is used. The cycle reversing valve of the present invention also provides improved segregation of the gasses within the valve, thereby lowering heat transfer losses.

Generally, the cycle reversing valve provides gas flow paths that provide more efficient and smooth communication of gas than the standard contraction/restriction and 180 degree bend of many known reversing valves. Additionally, in one embodiment magnetic coupling provides for control of the valve member, thereby eliminating braze leak paths and problems with external capillary tubes.

According to one aspect of the present invention, a four port reversing valve for a reversible-cycle refrigeration system having a compressor is constructed with the reversing valve having a first inlet port adapted to be connected to the compressor and second, third, and fourth ports, and further, having a rotatable valve member operable between first and second positions. The valve member in its first position connects the first inlet port with the second port and the third port with the fourth port, and the valve member in its second position connects the first inlet port with the fourth port, and the second port with the third port. The second and third, ports and the third and fourth ports are arranged so that the angle between the ports is greater than about 90°, more preferably greater than about 120°, and still more preferably equal to or greater than about 135°. In one embodiment the valve member is rotated between positions and in another it is translated linearly.

The valve member preferably has a smoothly contoured passage therethrough that connects the third port with the fourth port when the valve member is in its first position and that connects the third port with the second port when the valve member is in its second position, to provide a smooth flow path therethrough.

The four port reversing valve, in one embodiment, further comprises a rotating drive mechanism for rotating the valve member. The valve member is preferably magnetically coupled to the rotating drive mechanism, so that the valve member can be sealed inside the valve. The rotating valve mechanism may be an electric motor, a rotating solenoid, or other suitable drive. Alternatively, the rotating drive mechanism can be connected directly to the valve member. The rotating drive mechanism may be a linked rotary solenoid or hermetic motor.

While the principal advantages and features of the present invention have been explained above, these and other features and advantages will be in part apparent and in part pointed out in a more detailed description of the various embodiments and aspects of the invention as set out below.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
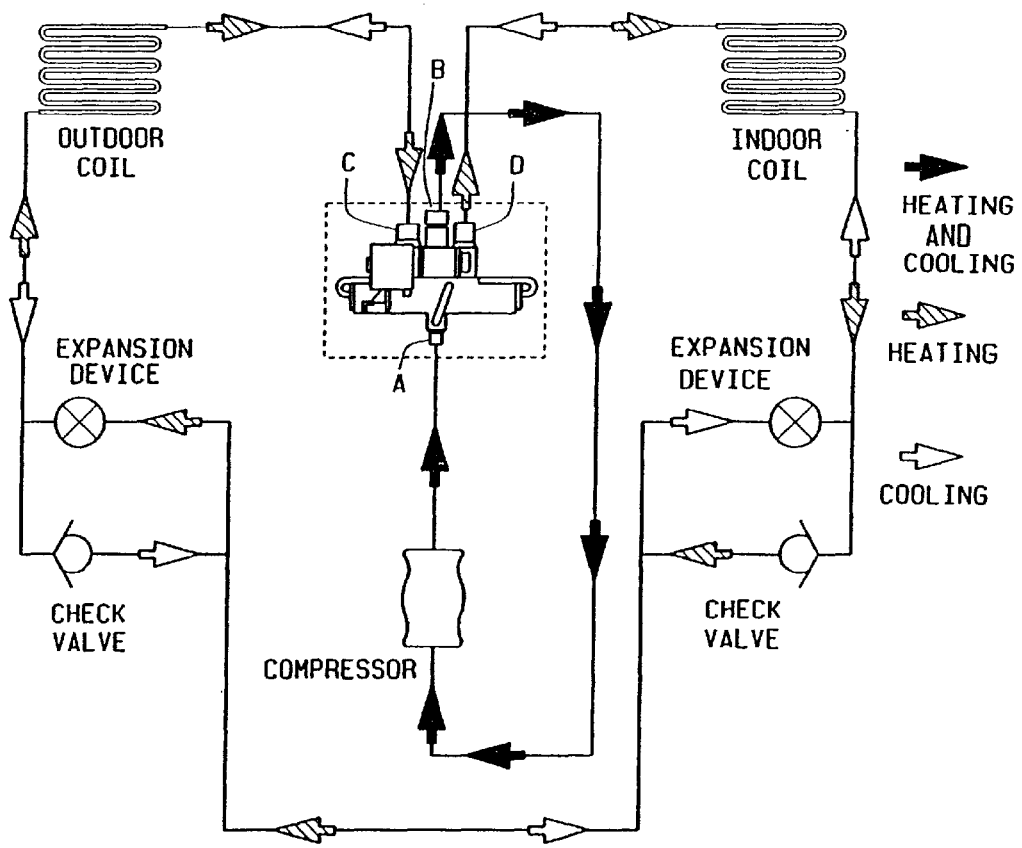
FIG. 1 is a schematic diagram of a typical prior art reversing valve.

A typical prior art reversing valve is shown in FIG. 1. The reversing valve has a high pressure inlet port A, a low pressure return port B, and ports C and D. A shuttle member E slides back and forth so that in one position the inlet port A and the port C are connected and the low pressure return port B and the port D are connected, and in another position (not shown) the inlet port A and the port D are connected and the low pressure return port B and the port C are connected. In either position, flow entering the low pressure return port B is severely necked down, and the direction of flow changes 180° inside the valve in each position thereof. This results in inefficiencies.

Figure 2:
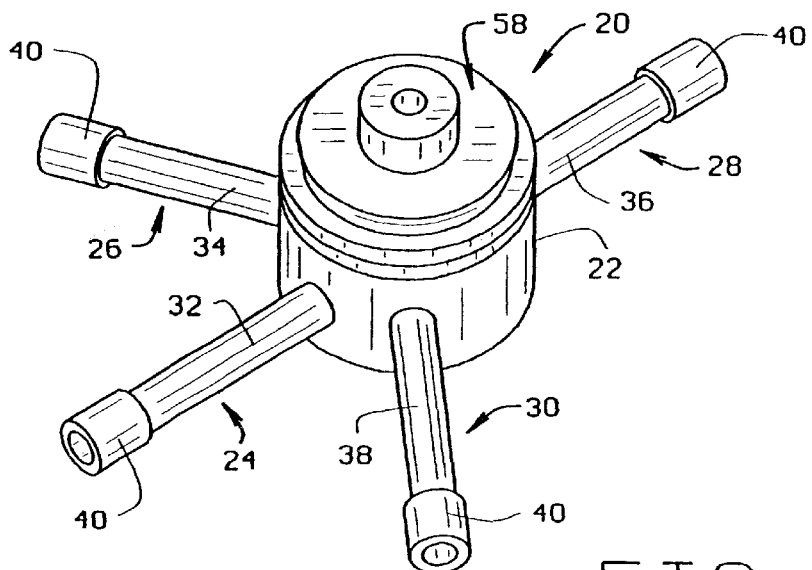
FIG. 2 is a perspective view from above of a first embodiment of a reversing valve constructed according to the principles of the present invention.
Figure 3:
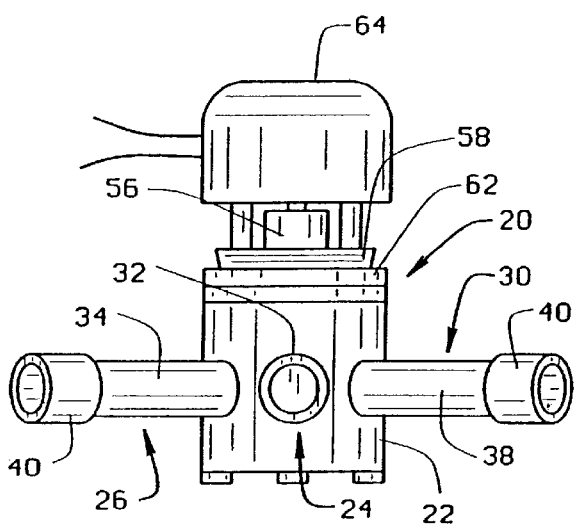
FIG. 3 is a side elevation view of the reversing valve of FIG. 2 with a motor attached.
Figure 4:
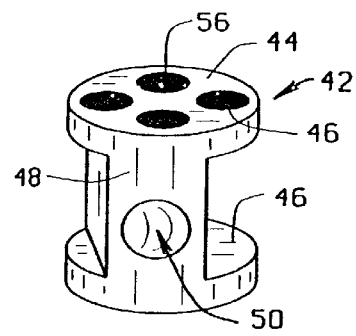
FIG. 4 is a perspective view of a valve member of the valve of FIG. 2 constructed according to the principles of the present invention.

A four port reversing valve constructed according to the principles of the present invention is indicated generally as 20 in FIG. 2. The valve 20 is adapted for use in a reversible cycle refrigeration system having a compressor. The reversing valve 20 comprises a generally cylindrical housing 22, having a first inlet port 24, for connection to the outlet of compressor, a second port 26, a third port 28, for connection to the inlet of the compressor, and a fourth port 30.

The first port 24 includes a tube 32, the second port 26 includes a tube 34, the third port 28 includes a tube 36, and the fourth part 30 includes a tube 38. The open ends of each of the tubes is provided with a fitting 40.

The housing 22 is preferably constructed of aluminum, brass or steel and the tubes 32, 34, 36 and 38 are preferably copper or aluminum. However, any suitable material may be used.

Figure 8:
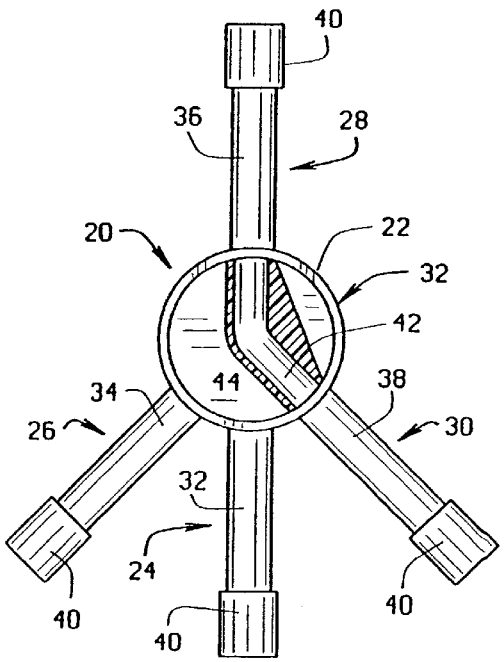
FIG. 8 is a horizontal cross sectional view of the reversing valve of FIG. 2 with the valve member of FIGS. 4 and 7 therein.
Figure 9:
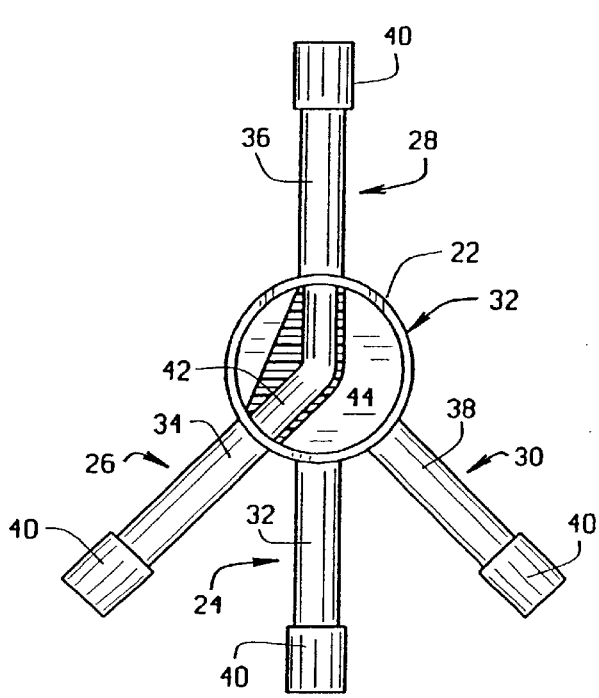
FIG. 9 is a horizontal cross-sectional view of the reversing valve of FIG. 8, with the valve member rotated.

There is a valve member 42 rotatably mounted inside the housing 22. The valve member 42 is generally disc shaped having a top panel 44, a bottom panel 46 and a body 48 therebetween. A smoothly contoured passage 50 extends generally transversely through the body 48, with a first end 52 on one side of the body and a second end 54 generally on the other side of the body. The valve member 42 is configured so that in a first position, the first inlet port 24 and the second port 26 communicate and the passage 50 connects the third port 28 and the fourth port 30 (see FIG. 8), and so that in a second position the first inlet port 24 and the fourth port 30 communicate and the passage 50 connects the third port 28 and the second port 26 (see FIG. 9).

The valve member 42 is preferably magnetically driven. The valve member 42 is preferably provided with magnets 56 on its top panel, and sealed in housing 22 by a lid 62. A driver 58, with magnets 60 is positioned adjacent the housing 22, over the sealed lid 62, so that the magnets 58 energize the magnets 56 on the valve member 42. Thus rotation of the driver 58 outside of the housing 22 causes the valve member 42 to rotate inside the housing. A device for rotating the driver 58, such as an electric stepper motor 64 or rotating solenoid, or motor and gear box, rotates the driver and thus the valve member 42. Alternatively the valve member 42 could be directly driven by a motor (such as a hermetic motor) or solenoid inside or outside the housing 22.

These magnets 54 and 58 preferably comprise neodymium iron boron, but other suitable permanent magnetic materials may be used. The valve member 42 is preferably constructed of a polymeric material, however, the valve member alternatively may be constructed as a PTFE coated steel member. It should be appreciated by one skilled in the art that any suitable material may be used.

Figure 5:
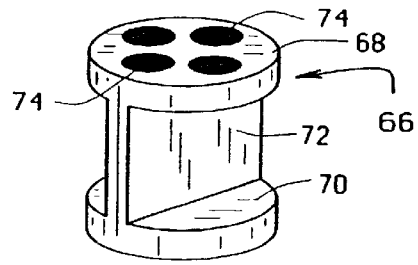
FIG. 5 is a perspective view of a second embodiment of a valve member constructed according to the principles of the present invention.
Figure 6:
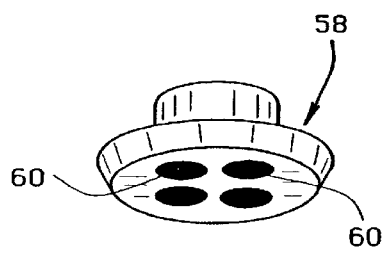
FIG. 6 is a perspective view of a rotating drive mechanism for driving the valve member according to the principles of the present invention.
Figure 7:
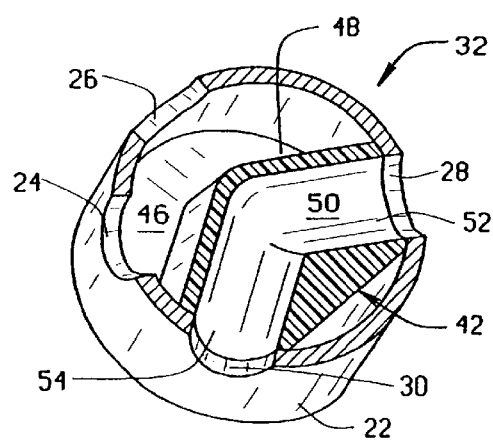
FIG. 7 is a top cross-sectional perspective view of the valve member of FIG. 4.
Figure 10:
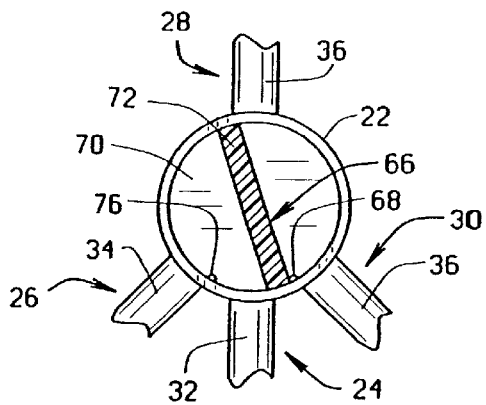
FIG. 10 is a horizontal cross-sectional view of the reversing valve employing the valve member shown in FIG. 5.
Figure 11:
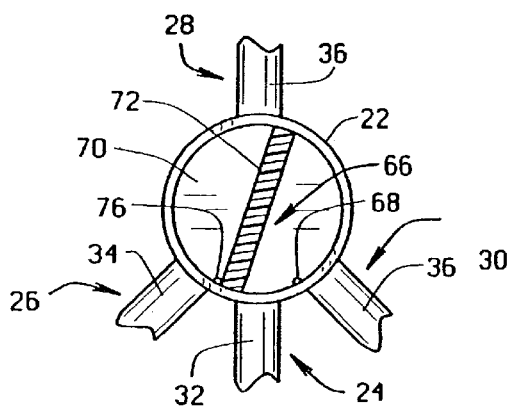
FIG. 11 is a horizontal cross-sectional view of the reversing valve of FIG. 10, with the valve member rotated.

A second embodiment of the valve member is indicated as 66 in FIGS. 5, 10 and 11. The valve member 66 is generally disc shaped, with a generally circular top panel 68, a generally circular bottom panel 70, and a body 72, extending transversely across the valve member. The body 72 of the valve member 66 divides the housing 22 into chambers such that in a first position the first inlet port 24 and the second port 26 communicate and the third port 28 and the fourth port 30 communicate (see FIG. 10), and so that in a second position the first inlet port 24 and 10 the fourth port 30 communicate, and the third port 28 and the second port 26 communicate (see FIG. 11).

The valve member 66 is preferably magnetically driven in this embodiment. The valve member 66 is preferably provided with magnets 74 on its top panel, and is sealed in housing 22. The magnets 60 on the driver 58 energize the magnets 74 on the valve member 66. Thus, rotation of the driver 58 outside of the housing 22 over lid 62 causes the valve member 66 to rotate inside the housing. A device for rotating the driver rotates the valve member 66 between its first and second positions. Stops 76 and 75 prevent over-rotation of valve member 66.

To effect a flow reversal, the valve member 42 must be rotated approximately 135° in the preferred embodiment so that the ends of the passage 50 move from connecting the second and third ports 26 and 28 to connecting the third and fourth ports 28 and 30. To effect flow reversals, the valve member 66 must be rotated about 45° in the preferred embodiment to move the chambers formed by the body 72 from connecting first and second ports 24 and 26 and third and fourth ports 28 and 30 to connecting the second and third ports 26 and 28 and the first and fourth ports 24 and 30.

Figure 12:
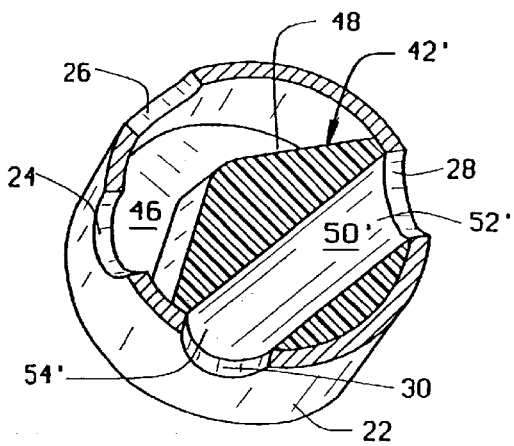
FIG. 12 is a perspective view, partly in section, of an alternate construction of the valve member shown in FIGS. 4, 7, 8 and 9.

In contrast to the prior art valves exemplified in FIG. 1, the valve 20 of the present invention does not have a necking down of the flow path or the 180° internal reversal of flow on the low pressure return in each position of the valve. This is achieved by having the angle between the third port 28, which is the low pressure return, and the second and fourth ports 26 and 30 to which the third port 28 is selectively connected, be at least 90°, more preferably 120°, and most preferably 135° as shown. This eliminates the sharp angle in the return flow path of prior art valves. The valve member 42 further improves efficiency by providing a smooth, continuous flow path through passage 50. The passage 50 preferably has substantially the same diameter as the ports 26, 28, and 30 to which it connects, and has a smoothly curved path that does not disturb the low pressure flow between the paths. As shown in FIGS. 4, 7, 8 and 9 the passage 50 in valve member 42 may have a single bend of about 135°. As shown in FIG. 12, an alternate construction of the valve member 42' has a straight passage 50'. Other passage configurations, such as arcuate or curved could also be used.

The valve member 66 likewise eliminates the sharp change of direction in the low pressure return path. While the valve member 66 does not provide a smooth continuous passage like valve members 40 and 40', it only requires a small rotation to change the flow direction.

Appropriate seals between the housing and the valve member are provided to prevent leakage between the two flow paths.

Figure 13:
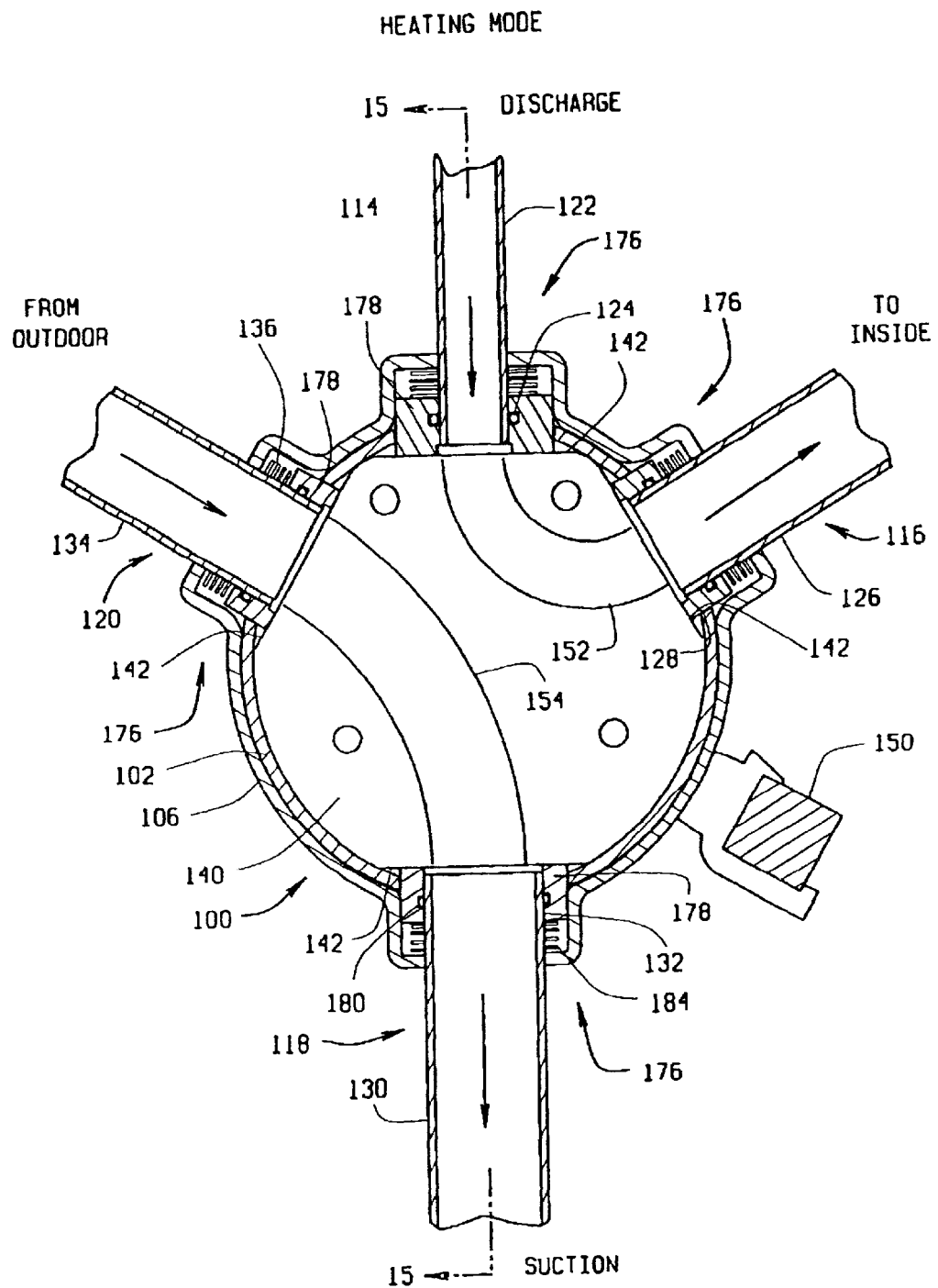
FIG. 13 is a sectional view of a third embodiment of a reversing valve incorporating the principles of the present invention and shown in a heating position.

FIG. 13 is a sectional view of a reversing valve 100 according to a third embodiment of the invention. Valve 100 is used in a reversible-cycle refrigerating system having a compressor (not shown). Valve 100 includes a generally circular cylindrical tubular enclosure 102 the ends of which are sealed by end caps 104. A sheet metal sleeve 106 is provided around the central portion of enclosure 102. Valve 100 further includes a first inlet port 114 for connection to the discharge outlet (not shown) of the compressor, a second port 116, a third port 118 for connection to the suction inlet (not shown) of the compressor, and a fourth port 120. In this third embodiment, third port 118 is oriented at an angle of approximately 135 degrees with respect to second port 116 and fourth port 120, thus avoiding necking down of low-pressure suction gas return flow through third port 118. Port 114 includes a connecting tube 122 having a base 124. Port 116 includes a connecting tube 126 having a base 128. Port 118 includes a connecting tube 130 having a base 132. Port 120 includes a connecting tube 134 having a base 136. Enclosure 102 has an opening through which each tube extends.

Figure 15:
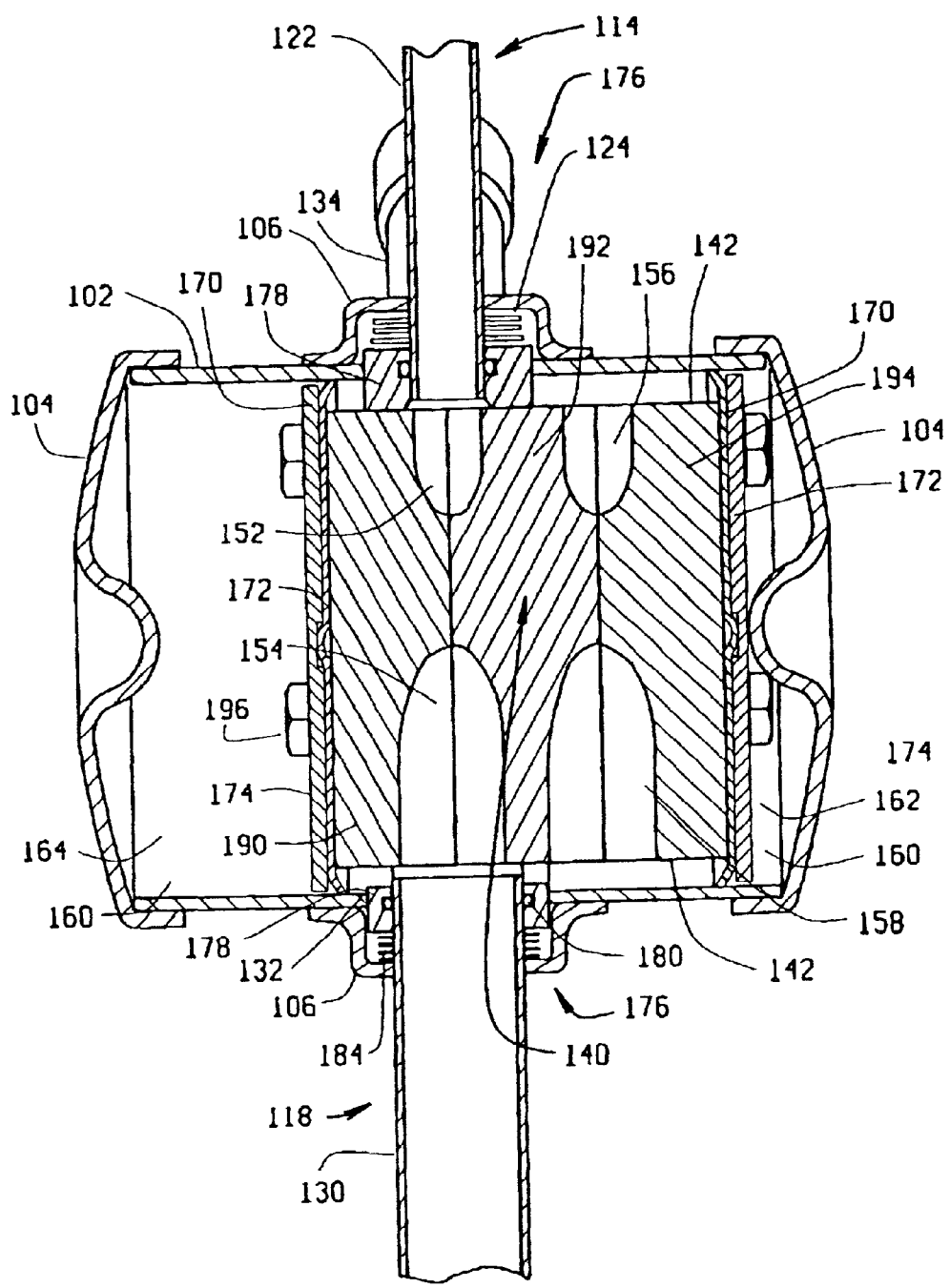
FIG. 15 is a cross-sectional view of the reversing valve taken along lines 19–15 in FIG. 13.
Figure 16:
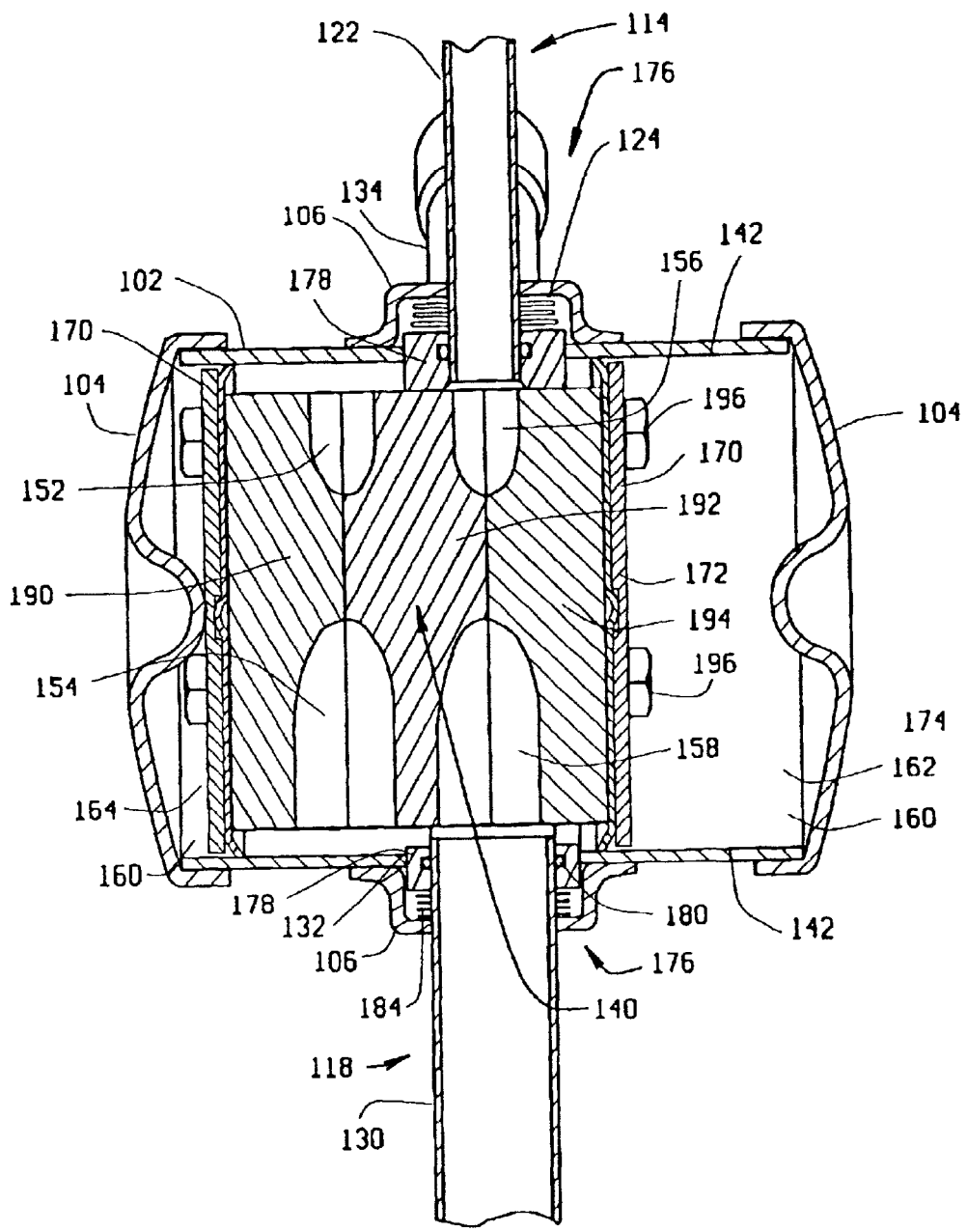
FIG. 16 is a view similar to FIG. 15, but showing the valve in a cooling position.

A generally cylindrical movable valve member 140 is located inside valve enclosure 102. In cross section valve member 140 is generally circular with longitudinally extending flat surface portions 142 disposed generally perpendicular to tubes 122, 126, 130 and 134. Under control of a four-way pilot valve 150, valve member 140 translates linearly between two operating positions within valve enclosure 102, i.e. to the right and left as shown in FIGS. 15 and 16. Pilot valve 150 may be any suitable conventional pilot valve. As further described below, two sets of curved conduits extend generally transversely through valve member 140, each set of conduits corresponding to an operating position of valve member 140. One of the sets of conduits, when aligned with ports 114, 116, 118 and 120, allows cycling in one direction. The other set, when aligned with ports 114, 116, 118 and 120, allows cycling of the system in a reverse direction.

More specifically, FIG. 13 shows valve 100 positioned in a first operating position, for example, for heating. Valve member 140 is provided with smoothly formed gently curving conduits 152 and 154. The conduits are arranged such that conduit 152 connects port 114 with port 116 while conduit 164 connects port 120 with port 118. Thus discharge pressure from the compressor (not shown) is routed through port 116, e.g. to an interior heat exchanger (not shown), while suction pressure draws from port 120, e.g. from an outdoor heat exchanger, for return to the compressor.

Figure 14:
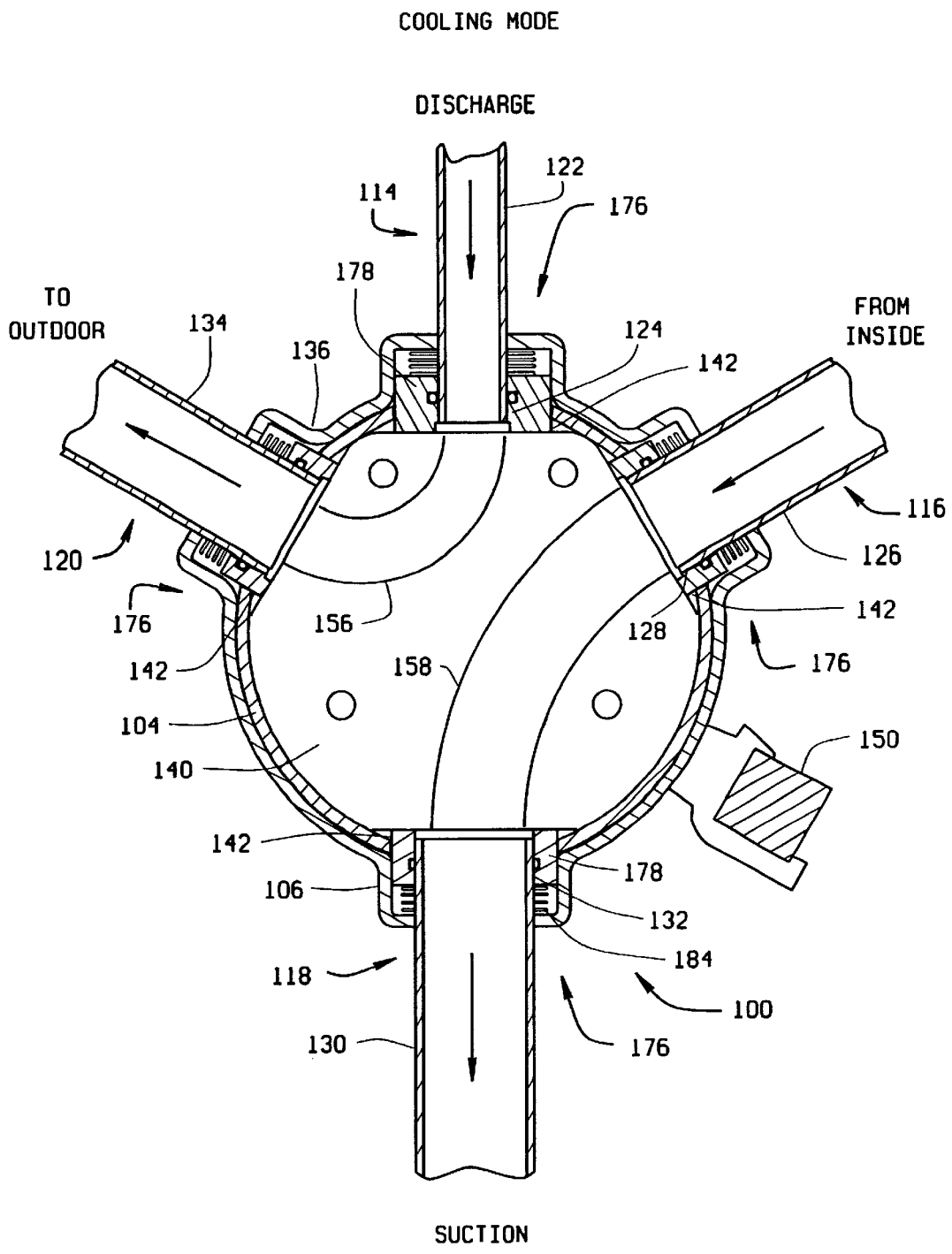
FIG. 14 is a sectional view of the reversing valve of FIG. 13 shown in a cooling position.

FIG. 14 is a sectional view of reversing valve 100 positioned in a second operating position, e.g. for cooling. More specifically, valve member 140 is provided with smoothly formed gently curving conduits 156 and 158. The conduits are arranged such that conduit 166 connects port 114 with port 120 while a conduit 158 connects port 116 with port 118. Thus discharge pressure from the compressor (not shown) is routed through port 120, e.g. to the outdoor heat exchanger, while suction pressure draws from port 116, e.g. from the indoor heat exchanger, for return to the compressor.

Conduits 152, 154, 156, and 158 are preferably circular in cross section, having a center axis which is substantially an arc of a circle. Conduits 154 and 156 have a very short arc length of approximately 45° for minimal flow losses, whereas conduits 152 and 156 have an arc length of approximately 135°.

FIG. 15 is a sectional view of reversing valve 100 positioned as shown in FIG. 13. Valve enclosure 102 is generally cylindrical and with end caps 103 encloses a chamber 160 having two opposing ends 162 and 164 between which valve member 140 is disposed to move. In one embodiment, valve enclosure 102 is fabricated of stainless steel to reduce conductive heat transfer from discharge gas connecting tubes to suction connecting tubes. In another embodiment, valve enclosure 102 is fabricated of another high-strength, thin-wall tubing material. In yet another embodiment, connecting tubes 122, 126, 130 and 134 are fabricated of high strength, thin-wall stainless steel to reduce conductive heat transfer.

To prevent internal leakage a unique sealing arrangement is provided for both the ports and the ends of the valve member. For the latter, cup-type lip seals 170 are mounted on the ends 172 of the valve member 140, using backing plates 174, thereby preventing leakage flow between valve member 140 and the ends 162 and 164 of chamber 160. As can be seen in FIG. 15, valve member 140 is formed in three pieces 190, 192, and 194, to facilitate the formation of curved conduits 152, 154, 156, and 158. The pieces are held together, along with seals 170 and backing plates 174, by through-bolts 196. The ports are sealed by sealing devices 176 surrounding each of connecting tube bases 124, 128, 132 and 136. For example, and referring to FIG. 15, sealing device 176 surrounding tube base 132 includes an annular elastomeric polymeric seal piece 178 having a flat sealing surface sealingly engaging flat surface 142 of the valve member 140. Seal piece 176 is sealed to tube base 132 by an o-ring 180 disposed in a groove in piece 176, and is loosely retained in place by a pocket formed in sleeve 106. A compression spring 184 surrounds tube 130 and acts between seal piece 178 and seal casing 186 to bias seal piece 178 into sealing engagement with valve member 140. Seal piece 178 may be fabricated of a refrigerant-compatible and lubricant-compatible elastomeric material. In one embodiment seal piece 178 is fabricated of a semi-soft material that deforms slightly under contact pressure with valve member 140. One suitable material is Rulon® or a similar combination of Teflon®, polyamide, fiberglass, and/or carbon, although other suitable materials may be used. All four sealing devices 178 are of the same construction.

Figure 17A:
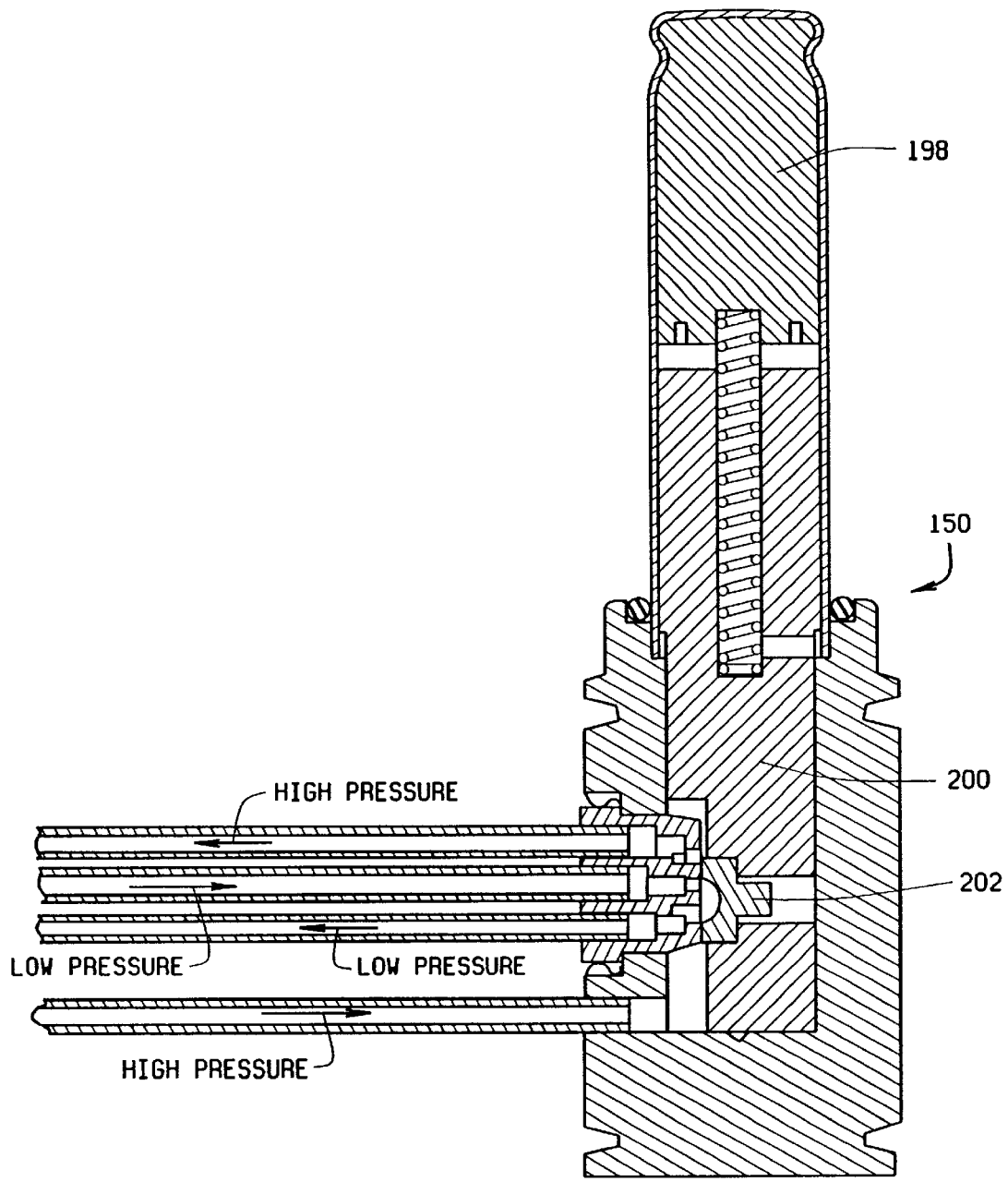
FIG. 17a is an enlarged diagrammatic cross-sectional view of the pilot valve in a first position.

Valve member 140 is shifted between its first and second operating positions within chamber 160 in the following manner. In a first position, shown in FIG. 17a, pilot valve 150 applies discharge pressure from tube 122 to at one end of chamber 160 while venting pressure from an opposite end of chamber 160 to tube 130. A pressure differential thus is generated between ends 162 and 164, causing valve member 140 to translate. For example, valve member 140 is shifted from the operating position shown in FIG. 15 to the position shown in FIG. 16, in the following manner. Pilot valve 150 applies a discharge pressure at end 162 while venting pressure from end 164 to tube 130. A pressure differential thus is generated between ends 162 and 164, causing valve member to translate toward end 164. The pilot valve can corrected to tubes 122 and 130, and the ends of enclosure 102 in any appropriate manner as will be understood by one of ordinary skill in the art.

Referring to tube 130 as shown in FIG. 15, for example, as the valve member is shifted to the left, tube base 132 comes into alignment with conduit opening 158, as shown in FIG. 16. Movement of seal piece 178 with respect to tube 130 accommodates slight misalignment with, and surface imperfections of, valve member 140. Spring 184 urges seal piece 178 into engagement with valve member 140. Sealing device 176 thus provides a gas-tight interface between tube base 132 and conduit opening 158.

Figure 17B:
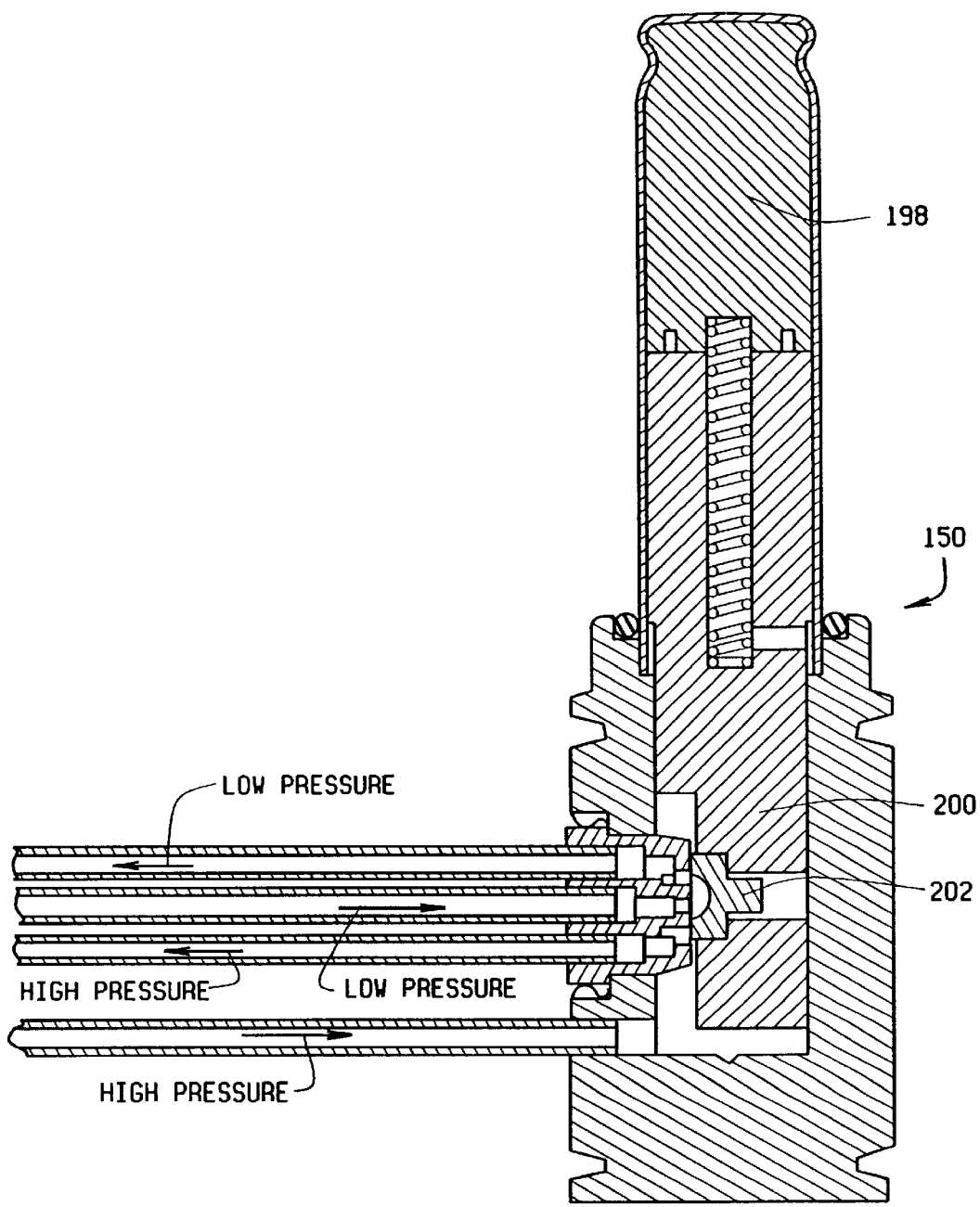
FIG. 17b is an enlarged diagrammatic cross-sectional view of the pilot valve in a second position.

A subsequent reversal of pilot valve 150, as shown in FIG. 17b, causes valve member 140 to return to the operating position shown in FIG. 15. The pilot valve 150 includes a solenoid 198 that moves an armature 200 which moves a slide valve 202 to change the connections among the lines to switch the high pressure and low pressure out lines in the manner shown. Thus reversing valve 100 operates to reverse the mode of operation of a refrigeration system. More specifically, when one of conduit sets (152, 154) and (156, 158) is aligned with ports 114, 116, 118 and 120 to the system cycles in one direction, and when the valve member 140 is translated, e.g. using pilot valve 150, to align the other of conduit sets (152, 154) and (156, 156) with ports 114, 116, 118 and 120, they system cycles in the reverse direction.

The above described reversing valve does not require a motor or gear train to move the valve member. By making use of a pilot valve 150 to shift the valve member 140, the above-described embodiment eliminates a need for relatively expensive rotating drive mechanisms. Since the pilot valve 150 may be a conventional solenoid actuated four-way valve, valve fabrication is simplified and fabrication costs are reduced. Additionally, the above-described sealing devices provide highly effective gas-tight seals for preventing internal leakage. Because each sealing device floats, it accommodates minor imperfections and misalignment of the valve member, thereby eliminating a need for costly precision machining of interfacing parts. Thus valve fabrication time and costs are further reduced. Also note that the flow of suction gas, which is at the lowest pressure controlled by the conduit having the largest diameter, the greatest radius of curative and the shortest arc length, in all positions of the valve.

Thus, while the present invention has been described by reference to specific embodiments, it should be understood and apparent to those skilled in the art that modifications and variations of the invention may be constructed without departing-from the scope of the invention. It is therefore intended that the invention be limited only by the scope of the claims appended hereto, and their equivalents.

What is claimed is:

1. A reversing valve for a heat pump system, comprising:

a generally cylindrical housing;

a generally cylindrical valve member disposed in said housing for movement therein between first and second positions;

first, second, third and fourth fluid conducting tubes connected to said housing;

ports in said valve member for controlling the flow of fluid to and from each of said tubes; four of said ports being in fluid communication with four of said tubes, respectively, in each of said first and second positions of said valve;

a separate floating seal disposed between said tubes and said valve element in each of said first and second positions to prevent internal leakage, each floating seal comprising an annular elastomeric seal member surrounding each said tube in a sealed relationship and sealingly engaging the surface of said valve member surrounding the port communicating with the tube, each seal member being sealed with regard to its tube by means of an O-ring disposed in a groove in said seal member.

2. A reversing valve as claimed in claim 1 wherein each said seal member is retained in place for limited floating movement, and further comprising a spring for biasing each said seal member against said valve member surface.

3. A reversing valve as claimed in claim 1 wherein each said spring is a compression coil spring surrounding said tube and acting between said housing and said seal member.

4. A reversing valve for a heat pump system comprising:

a housing;

first, second, third and fourth fluid conducting tubes radiating from the housing, arranged generally in a plane, with the first tube opposite from the third tube, and the second and fourth tubes disposed approximately 135° from the third tube;

a valve member in the housing, translatable in the housing between a first and second position, the valve member having first and second sets of conduits, the first set of conduits generally aligned with the tubes when the valve member is in its first position, connecting the first and second tubes and the third and fourth tubes, and the second set of conducts generally aligned with the tubes when the valve member is in its second position, connecting the first and fourth tubes, and the second and third tubes;

the valve member having flat surfaces thereon generally facing each of the tubes, with the conduits en each set opening the flat surfaces, and each of the tubes having a floating sealing member for sealing against the flat surface to sealingly communicate with the openings of the conduits, while permitting the valve member to move.

5. A reversing valve as claimed in claim 1 wherein said third fluid conducting tube is disposed approximately 135° from said second and fourth fluid conducting tubes.

6. A reversing valve as claimed in claim 1 wherein said first, second and fourth fluid conducting tubes are disposed approximately 135° or more from said third fluid conducting tube.

* * * * *